(No Model.)

C. H. SHATTUCK.
AXLE BOX.

No. 373,912. Patented Nov. 29, 1887.

WITNESSES
A. E. Leach.
A. M. English.

INVENTOR
Chas. H. Shattuck
By his Attorney
Wm. B. H. Dowse.

UNITED STATES PATENT OFFICE.

CHARLES H. SHATTUCK, OF BOSTON, MASSACHUSETTS, ASSIGNOR TO WILLIAM E. BOWDITCH, OF SAME PLACE.

AXLE-BOX.

SPECIFICATION forming part of Letters Patent No. 373,912, dated November 29, 1887.

Application filed June 22, 1887. Serial No. 242,102. (No model.)

*To all whom it may concern:*

Be it known that I, CHARLES H. SHATTUCK, a citizen of the United States, residing at Boston, in the county of Suffolk and Commonwealth of Massachusetts, have invented certain new and useful Improvements in Axle-Boxes, of which the following is a clear and exact specification.

My invention consists of improvements in anti-friction axle-boxes.

The objects of my improvements, among other things, are to provide a continuously-lubricated journal-bearing, to prevent the axle under any circumstances from sliding out of the box, to prevent leakage of oil from the bearings, to effectually protect the interior of the box from dust, to protect the axle from wear by receiving the wear on a sleeve, and to prevent any inthrust of the axle.

The accompanying drawings represent a form of axle-box embodying my invention, in which—

Figure 2:
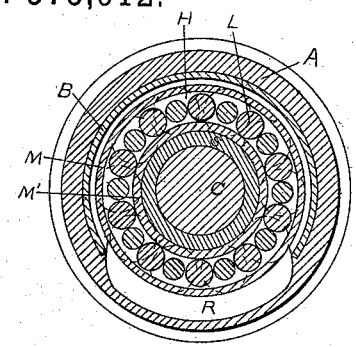
Figure 1:
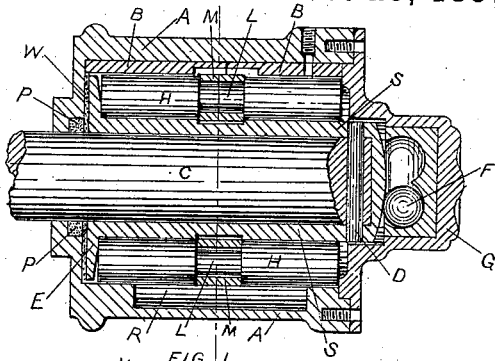
Figure 4:
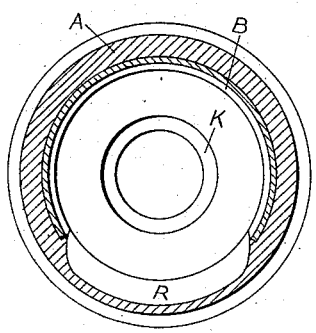
Figure 3:
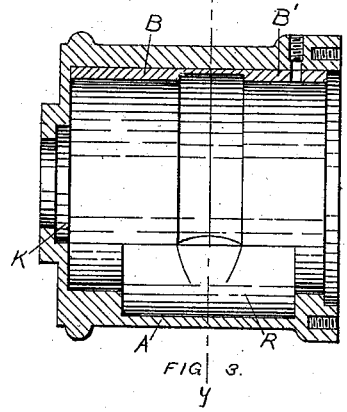
Figure 5:
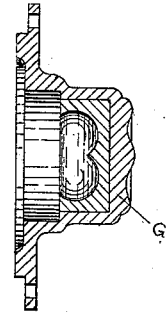
Figure 7:
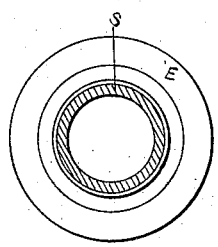
Figure 6:
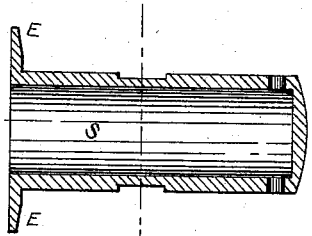
Figure 8:
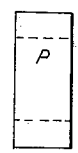
Figure 9:
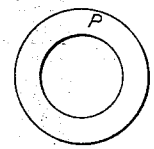
Figure 10:
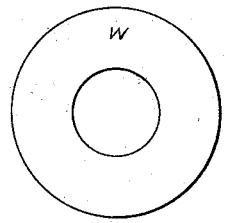
Figure 11:
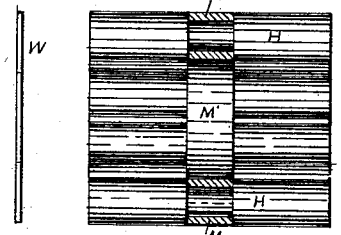
Figure 12:
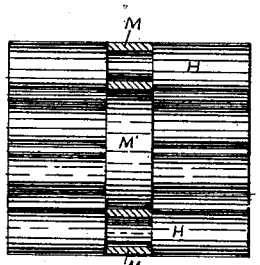
Figure 13:
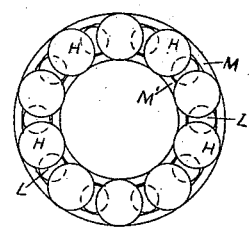

Figure 1 is a section of the complete axle-box with its parts in place through the longitudinal axis. Fig. 2 is a transverse sectional view of the same through $x\ x$, Fig. 1. Fig. 3 is a section of the outer casing alone through its axis. Fig. 4 is a transverse section through $y\ y$, Fig. 3. Fig. 5 is a section through the axis of the lid. Figs. 6 and 7 are longitudinal and transverse sections, respectively, through the sleeve. Figs. 8 and 9 are views of the felt packing; Figs. 10 and 11, of the leather or vulcanized-fabric washer. Figs. 12 and 13 represent, respectively, a longitudinal section and an end view of the anti-friction rollers.

A is the box proper or outer casing, around the upper inner surface of which are pressed the segmental inner bearings or linings, B B', of steel or any suitable material, made, preferably, in two similar pieces B and B', and passing preferably around considerably more than half the inner surface of the box, as shown. A suitable recess is cast in the box A, to receive the linings B B', which from their construction may be easily inserted into or removed from the box A. The bottom of the box is cast with a reservoir, R, for holding the oil with which the bearings and movable parts are lubricated. This reservoir, being a hollow recess in the bottom of the box, breaks the continuity of the inner cylindrical surface formed in part by the segmental bearings B B', the width of the reservoir being preferably the same as that of the two bearings B B'. In the back of this box A is formed a recess, K, to receive a soft packing, P, preferably of felt, around the axle C, the object of the packing being to keep the oil in and the dust out. The axle C fits into a sleeve, S, of hardened steel or any suitable material, and is firmly secured therein by the pin D, driven tightly through it. A washer, W, made, preferably, of leather or vulcanized fabric, fits over the axle into the back part of the box. The sleeve S is provided with a flange, E, which revolves against the washer W. The flange E is intended to take the end-thrust of the car when rounding a curve—that is, to prevent the axle from sliding out from the end of the box—thus distributing the alternate thrust and pull on all four boxes of the car and keeping the same constantly parallel. The use of the washer W, moreover, serves to prevent the wear of the flanged end E against the back of the box. The outer end of the sleeve S is closed over the end of the axle, as shown in the drawings, and works against the ball-bearing F let into the inside of the lid G of the box, the lid being recessed, so as to receive the pin D, thereby preventing its working out in any way.

In Figs. 12 and 13 are shown a form of anti-friction rollers now in use in axle-boxes, consisting of a series of rolls, H H, held loosely in place by two rings, M M, bearing against reduced journals in the central portion of the rolls H H, and having also short separating-rolls L L.

In my improved axle-box the sleeve S, revolving with the axle, bears against the inner circle of the rolls H H, while the rolls themselves revolve inside the bearings B B', as shown. The flange E of the sleeve S is preferably beveled on the side toward the rolls, as shown in Figs. 1 and 6, thereby reducing the friction between the flange and the ends of the friction-rollers H H. The rolls H H in revolving dip into the oil contained in the reservoir R, thus splashing the oil constantly among the movable parts and insuring an even lubrication of the same.

Figs. 1 and 2 show the parts in place when in operation. The axle C being first pushed through the back of the box A, the soft packing P is pressed into the recess K and around the axle. The washer W is then put in place against the back of the box, and the axle is next inserted into the sleeve S and fastened therein by the pin D, the flanged end E of the sleeve S bearing against the washer W, as shown. The anti-friction rollers are then slipped over the sleeve S into the box, and the lid G is lastly fastened to the box with the ball F in place, thereby forcing the sleeve firmly back against the washer W, compressing the packing P and rendering the box oil and dust tight.

What I claim is—

1. In an axle-box, the combination of an outer casing, having a recessed oil-reservoir and segmental inner bearings, with anti-friction rollers and an axle provided with a flanged sleeve, S, substantially as and for the purposes described.

2. In an axle-box, an outer casing having a recessed oil-reservoir breaking the continuity of the inner cylindrical surface of said casing at the bottom, in combination with segmental inner bearings, substantially as described.

3. An axle-box and an axle provided with a beveled flanged sleeve, substantially as described.

4. In an axle-box, the combination of an outer casing with a sleeve, S, flanged at one end and closed at the other, an axle, C, soft dust-packing P, and hard-fiber washer W, substantially as and for the purposes described.

5. An axle-sleeve closed at one end and provided at the other with a flange, substantially as and for the purposes specified.

6. In an axle-box, the combination of an outer casing, an axle provided with a flanged sleeve, and anti-friction rollers, substantially as set forth.

In witness whereof I have hereunto set my hand.

CHARLES H. SHATTUCK.

Witnesses:
WM. B. H. DOWSE,
ALBERT E. LEACH.